UNITED STATES PATENT OFFICE 1,994,133

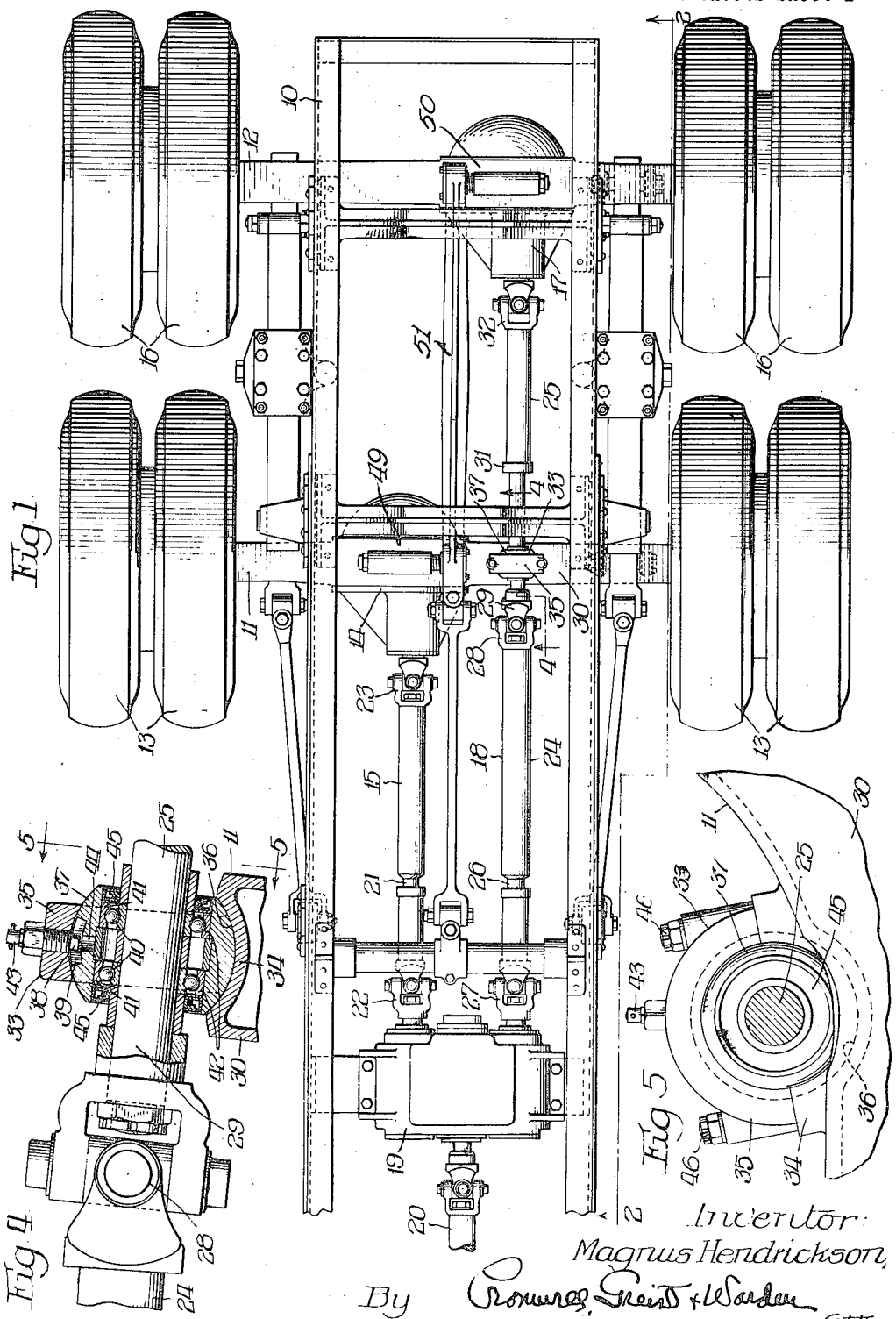

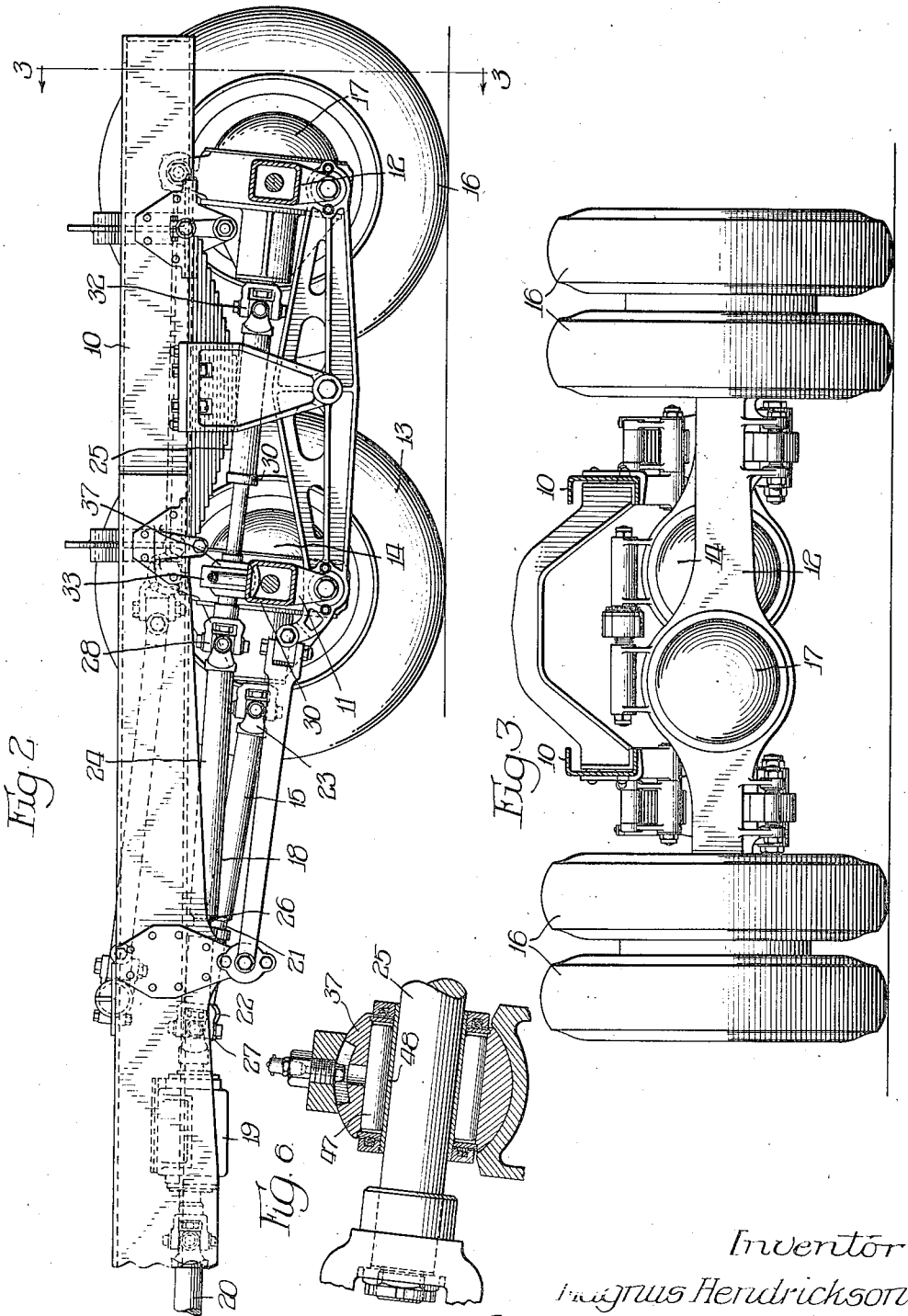

MOTOR VEHICLE

Magnus Hendrickson, Chicago, Ill., assignor to Hendrickson Motor Truck Co., Chicago, Ill., a corporation of Illinois Application April 18, 1932, Serial No. 605,832

3 Claims. (Cl. 180—22)

This invention is concerned with motor vehicles of the dual rear axle type.

The primary object of the invention is to provide an improved mounting for the propeller shaft which extends rearwardly to the second rear axle unit.

The improved shaft mounting permits of practically a straight line drive, does not interfere with free up and down movement of either rear axle unit and is comparatively inexpensive to manufacture and install.

Other more specific objects and advantages of the invention will be apparent to those skilled in the art upon a full understanding of the construction, arrangement and operation of the parts which cooperate to form the improved mounting.

Two slightly different embodiments of the invention are presented herein by way of exemplification, but it will of course be appreciated that the invention is capable of being incorporated in other structurally modified forms coming equally within the scope of the appended claims.

In the accompanying drawings:

Fig. 1 is a plan view of the rear end of a motor vehicle chassis equipped with the improved propeller shaft mounting;

Fig. 2 is a partially sectioned side view of the same, taken on approximately the line 2—2 of Fig. 1;

Fig. 3 is a partially sectioned rear view of the same, taken on approximately the line 3—3 of Fig. 2;

Fig. 4 is a vertical section through the propeller shaft mounting, taken on the line 4—4 of Fig. 1;

Fig. 5 is another vertical section through the mounting, taken on the line 5—5 of Fig. 4; and Fig. 6 corresponds to Fig. 4 but shows a slightly modified form of the invention.

The chassis which is shown in the drawings includes a frame 10 and two rear axle units 11 and 12 on which the rear end of the frame is supported. The wheels 13 on the ends of the first rear axle 11 are driven through a differential 14 from a short propeller shaft 15, while the wheels 16 on the ends of the second rear axle 12 are driven through a differential 17 from a separate relatively long propeller shaft 18. The differentials 14 and 17, and the propeller shafts 15 and 18 connected with the same, are offset laterally with respect to the center line of the frame 10, the differential 14 with the shaft 15 being located adjacent one side of the frame and the differential 17 with its shaft 18 being located in spaced generally parallel relation adjacent the other side of the frame. Both of the propeller shafts 15 and 18 are connected at their ends to a third differential 19 which is mounted on the frame 10. The differential 19 is driven from a centrally arranged propeller shaft 20 which extends rearwardly from the motor, clutch and transmission assembly on the front end of the frame.

In the particular embodiment shown, the frame 10 is supported on the two rear axle units 11 and 12 by an advantageous spring and linkage arrangement which is disclosed and claimed in Hendrickson Patent No. 1,658,164, but it will of course be understood that other supporting means may be employed without detracting from the benefits obtainable with the novel propeller shaft mounting which forms the subject matter of this invention.

The propeller shaft 15 for the first rear axle unit is of extensible two-part telescoping construction at 21, is provided at its front and rear ends with universal joints 22 and 23, and extends downwardly and rearwardly at a slight inclination from the differential 19 to the differential 14.

The propeller shaft 18 for the second rear axle unit, which is about twice as long as the propeller shaft 15, consists of a front section 24 and a rear section 25. The front section 24, like the shaft 15, is of extensible two-part telescoping construction at 26, is provided at its front and rear ends with universal joints 27 and 28, and extends downwardly and rearwardly at a little more gradual inclination from the differential 19 to the front end 29 of the rear shaft section 25, which end is located at a point above and in advance of the housing 30 of the first axle unit.

The rear section 25 of the propeller shaft 18 is of extensible two-part telescoping construction at 31, is arranged substantially in axial alignment with the front section 24 as a rearward continuation of the latter when the two rear axle units are in their normal positions, overlies the housing 30 of the first axle unit, and is provided at its rear end with a universal joint 32 which is connected to the differential 17. The rear section 25 is mounted adjacent its front end in a bracket 33 which is located on top of the axle housing 30 and is preferably formed as an integral part of the latter.

The bracket 33, which consists of a base portion 34 and a removable cap 35, is shaped on the inside thereof to form a spherical socket 36 in which a spherical barrel 37 is positioned. The barrel 37 is prevented from rotating in the socket by a screw-threaded stud 38 in the cap 35 which projects into a narrow slot 39 in the barrel, but the barrel is permitted to turn freely in all other directions by the elongated character of the slot. The rear section 25 of the propeller shaft 18 extends through the barrel 37 and is journaled therein on ball bearings 40. The outer races 41 of the bearings are fixedly secured to the inner periphery of the barrel, while the inner races 42 are fixedly secured to the outer periphery of the shaft section 25, all as clearly shown in Fig. 4. The bearings 40 may be lubricated through a hollow fitting 43 which may be advantageously combined with the stud 38. The lubricant enters the barrel through a hole 44 in the latter and is kept in the bearings by suitable oil retainers 45 in the ends of the barrel. The cap 35 is held in place by means of readily removable bolts 46.

The above described disposition of the propeller shaft for the second rear axle unit gives a practically straight line drive to such unit, permits of the use of ordinary bevel gear single reduction differentials in both units, and allows the shaft to conform freely and smoothly to the changes in the positions of the units. The bracket in which the shaft is journaled is exceedingly simple in construction, efficient in operation, inexpensive to manufacture, easy to install and readily accessible for servicing.

In the modification which is shown in Fig. 6, the spaced ball bearings 40 in the barrel 37 are replaced by an elongated roller bearing 47, and the inner race of the bearing, which consists of a tube 48, is free on the rear propeller shaft section 25 in so far as endwise movement is concerned, thus permitting the shaft section 25 to float endwise in the bracket, thereby eliminating the necessity for any slip joint in that section of the rear propeller shaft.

The particular embodiments of the invention herein illustrated and described are not to be construed as limiting the invention to such embodiments, as other structurally modified forms and arrangements are of course contemplated. For instance, instead of using low entry bevel gear differentials in the rear axle units, other types and arrangements of differentials might be employed, such as overhead worm gear differentials, and the propeller shafts might extend horizontally instead of downwardly at an inclination, or might even extend upwardly at an inclination, or in part horizontally and in part downwardly or upwardly at an inclination, all as conditions best warrant. Also, the flexibly mounted journal for the rear axle unit propeller shaft might be located at the bottom of the first rear axle unit, or even inside of the axle housing, or might be attached to some part of the unit other than the housing.

It will be noted in the preferred embodiment of the invention shown in Figs. 1 to 5 inclusive that the inner sides of the upwardly projecting portions 49 and 50 of the differential housings are coupled together by a pivotally attached link 51 which extends horizontally along the center line of the frame. This link, because of its elevated position with respect to the axles and its close proximity to the propeller shafts, affords a very strong, fully flexible connection between the axles at that point.

I claim:
1. In a motor vehicle, a frame, two rear axle units beneath the frame provided with differentials which are located adjacent the center line of the frame but are oppositely offset with respect to the same, said units being characterized by housings which are enlarged and project upwardly toward the bottom of the frame at the locations of the differentials, a third differential mounted on the frame at the center of the same in front of the first rear axle unit, two propeller shafts which extend rearwardly from the third differential at points at opposite sides of the center line of the frame in longitudinal alignment respectively with the differentials in the rear axle units, one of said shafts being comparatively short and extending to the differential in the first rear axle unit, the other of said shafts being comparatively long and extending over the first rear axle unit beneath the frame to the differential in the second rear axle unit, a link connecting the inner sides of the upwardly projecting portions of the housings along the center line of the frame, and a bracket mounted on the housing of the first rear axle unit at one side of the upwardly projecting portion thereof and on the opposite side of the center line of the frame, in which bracket the last mentioned shaft is universally journaled.

2. In a motor vehicle of the type having a frame and two rear axle units beneath the frame provided with differentials oppositely offset from the center line of said frame, the combination with a third differential mounted on the front of said frame and having independent propeller shafts operatively connecting said third differential with the respective differentials of said rear axle units, of mounting means for the propeller shaft for the last rear axle unit, comprising a housing for the first rear axle unit, a bracket mounted on said housing, the propeller shaft for the last rear axle unit rotatably mounted therein, means for preventing the rotation of said bracket on an axis parallel to the axis of rotation of said last named propeller shaft, said last named propeller shaft being otherwise universally journaled within said bracket.

3. In a motor vehicle of the type having a frame and two rear axle units therebeneath with differentials oppositely offset from the center line of said frame and having independent propeller shafts operatively connecting the differentials of the first and last rear axle units respectively to a third differential, a bracket mounting means for the propeller shaft of the last rear axle unit, said bracket mounting means comprising a housing on the first rear axle unit, a lower socket portion rigidly mounted on said housing, a barrel member mounted on said socket and rotatably receiving said last named propeller shaft therethrough, means for preventing the rotation of said barrel on an axis parallel to the axis of rotation of said last named propeller shaft, and means for providing lateral and longitudinal movement for said barrel within said socket.

MAGNUS HENDRICKSON.